(12) United States Patent
Kraemer et al.

(10) Patent No.: US 7,392,128 B2
(45) Date of Patent: Jun. 24, 2008

(54) METHOD AND DEVICE FOR BIDIRECTIONAL SINGLE-WIRE DATA TRANSMISSION

(75) Inventors: Rolf Kraemer, Schwieberdingen (DE); Ulrich Bentel, Wiernsheim (DE); Bernhard Eisele, Rangendingen (DE); Markus Ketterer, Stuttgart (DE); Uwe Schiller, Sersheim (DE); Juergen Stein, Illingen (DE)

(73) Assignee: Robert Bosch GmbH, Stuttgart (DE)

( * ) Notice: Subject to any disclaimer, the term of this patent is extended or adjusted under 35 U.S.C. 154(b) by 106 days.

(21) Appl. No.: 10/567,507

(22) PCT Filed: Jul. 2, 2004

(86) PCT No.: PCT/DE2004/001408

§ 371 (c)(1),
(2), (4) Date: Nov. 6, 2006

(87) PCT Pub. No.: WO2005/015817

PCT Pub. Date: Feb. 17, 2005

(65) Prior Publication Data
US 2007/0073449 A1   Mar. 29, 2007

(30) Foreign Application Priority Data
Aug. 6, 2003   (DE) .............................. 103 35 904

(51) Int. Cl.
G06F 19/00 (2006.01)
B05D 1/00 (2006.01)

(52) U.S. Cl. ....................................... 701/102; 701/115
(58) Field of Classification Search ................. 701/101, 701/102, 115
See application file for complete search history.

(56) References Cited

U.S. PATENT DOCUMENTS 3,943,283 A * 3/1976 Caragliano et al. .......... 370/293
6,006,143 A   12/1999 Bartel et al.
6,289,267 B1 * 9/2001 Alexander et al. .......... 700/286

\* cited by examiner

Primary Examiner—John T Kwon
(74) Attorney, Agent, or Firm—Kenyon & Kenyon LLP

(57) ABSTRACT

A device and a method are described for bidirectional single-wire data transmission of information between a control unit and at least one peripheral unit, having the following steps: generating a first current flow from the control unit to the peripheral unit during first time slots via a single-wire line to transmit voltage-coded or current-coded information from the control unit to the peripheral unit; and/or generating a second current flow from the peripheral unit to the control unit during second time slots via the single-wire line to upload voltage-coded or current-coded information from the peripheral unit to the control unit; the first and second time slots being implemented so they do not mutually overlap; and/or generating, in the first and/or second time slots, additional information to be transmitted and/or uploaded, which is transmitted as digital or analog signals by modulating the current or the voltage of the single-wire line and is analyzed in the control unit or the peripheral unit.

14 Claims, 8 Drawing Sheets

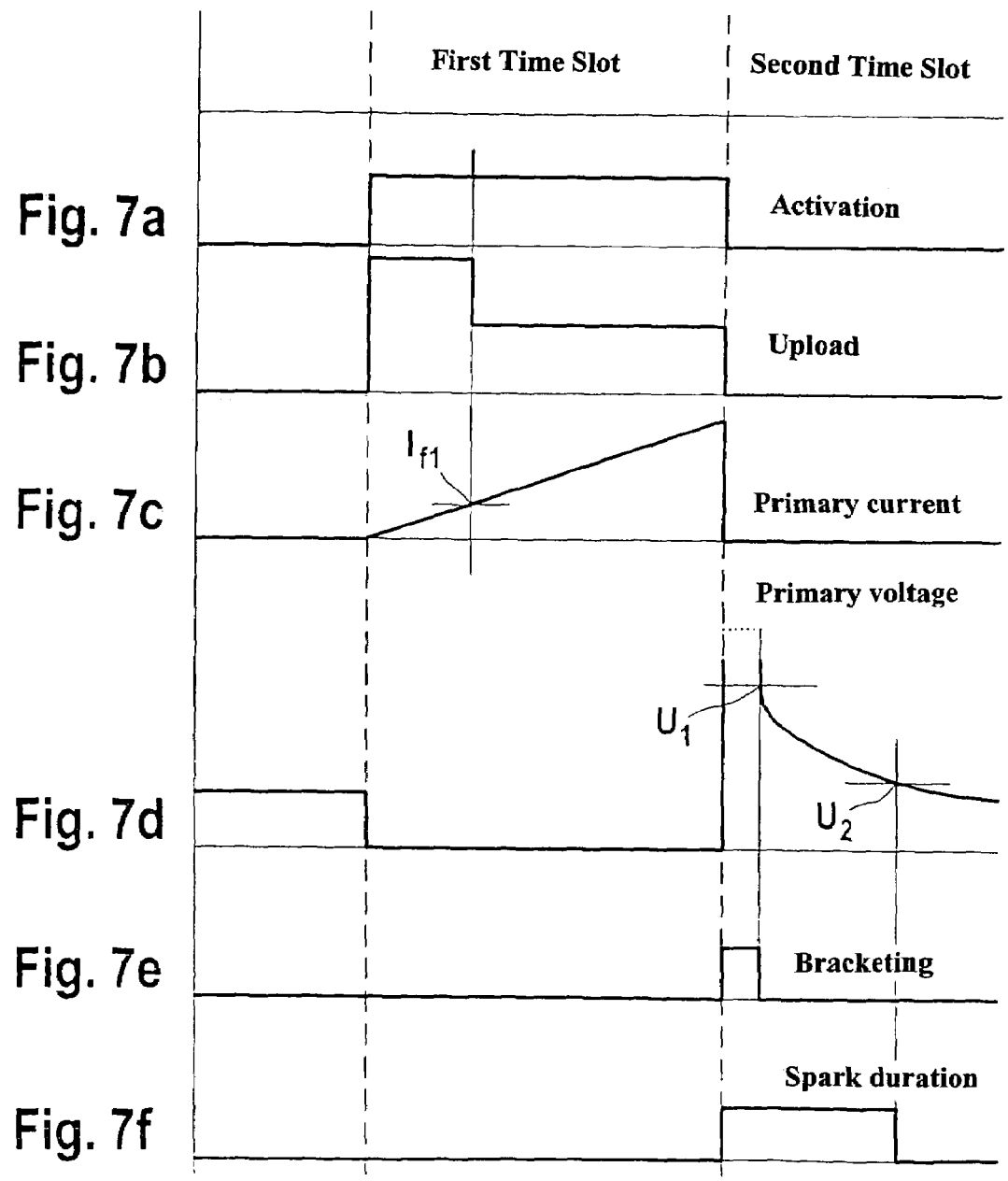

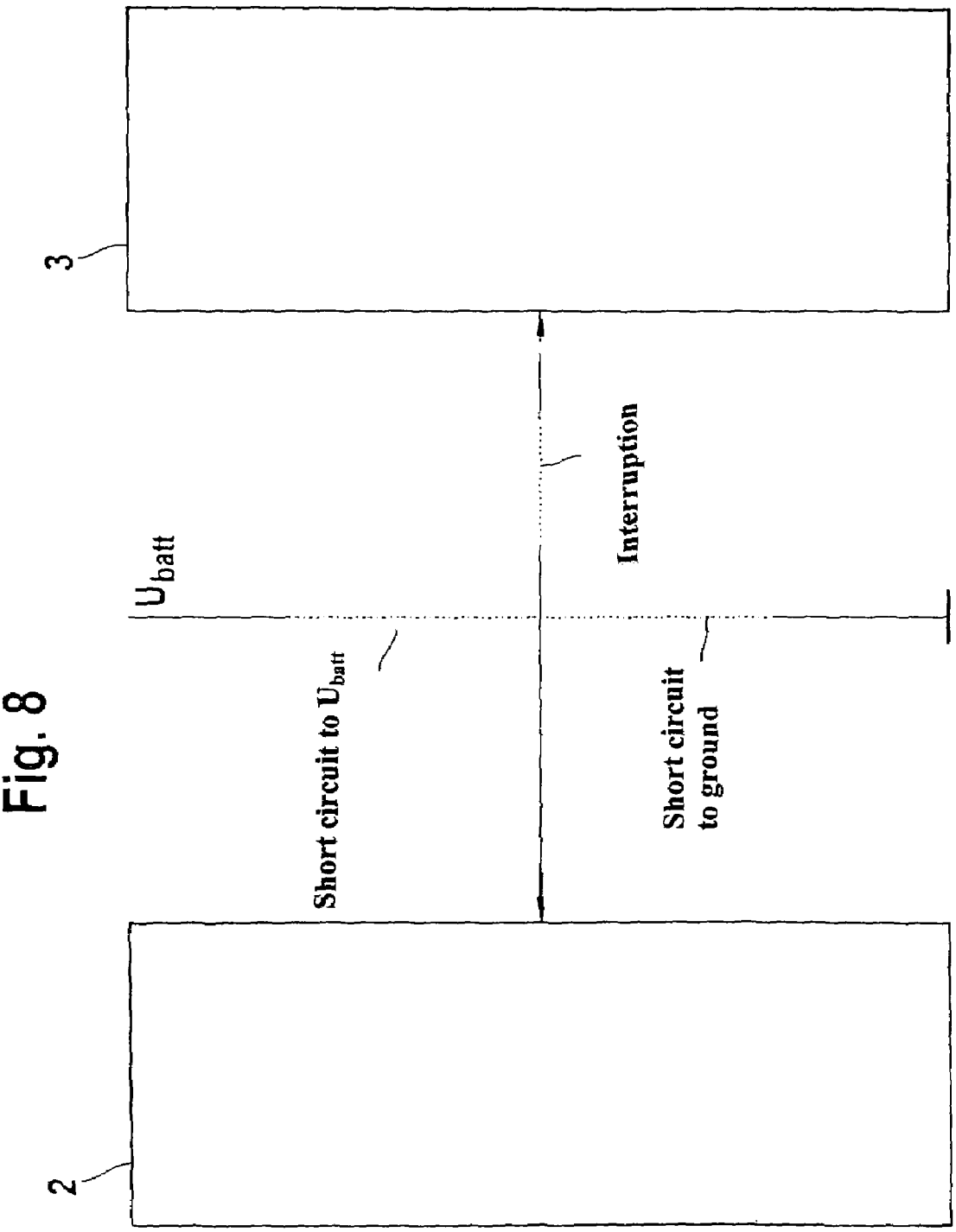

METHOD AND DEVICE FOR BIDIRECTIONAL SINGLE-WIRE DATA TRANSMISSION

FIELD OF THE INVENTION

The present invention relates to a method and a device for bidirectional single-wire data transmission of data information between a control unit and at least one peripheral unit, the function of the single-wire line being able to be diagnosed.

BACKGROUND INFORMATION

Although it is applicable to any arbitrary systems which include a control unit and at least one peripheral unit connected thereto using a line, the present invention and the set of problems on which it is based will be explained in relation to an ignition system or an injection system for gasoline engines in the field of motor vehicles, for example.

In current motor vehicle technology, systems are used in which peripheral units are connected via lines to a control unit. In this case, the corresponding peripheral units are usually spatially separated from the control unit, because of which special requirements are to be placed on the lines and the interfaces.

Some interfaces and/or bus systems for motor vehicle applications are already known, such as the CAN bus system. These bus systems are not suitable for real-time systems, however, i.e., for immediate triggering of the switching operation in the microsecond range, but rather solely for non-time-critical data exchange in the millisecond range of spatially distributed systems.

Further systems have the disadvantage that they may only upload information during activation of the peripheral unit by the control unit.

SUMMARY OF THE INVENTION

The method according to the present invention and the corresponding device have the advantage in relation to the known approaches that a fail-safe interface having only one line between the control unit and the particular peripheral unit to be activated, such as an ignition coil or a fuel injector of a motor vehicle engine, is provided, the interface having real-time capability for the existing chronological conditions, as they exist in ignition systems or injection systems in motor vehicles, for example.

Furthermore, using the system according to the present invention, feedback information may be uploaded from the peripheral unit to the control unit, even if there is no activation of the peripheral unit by the control unit.

In addition, the status of the single-wire line may be monitored for proper functioning.

The idea on which the present invention is based is that a first current flow from the control unit to the peripheral unit is generated during first time slots via a single-wire line to transmit voltage-coded or current-coded information from the control unit to the peripheral unit, and a second current flow from the peripheral unit to the control unit is generated during second time slots via the same single-wire line to upload voltage-coded or current-coded feedback information from the peripheral unit to the control unit, the first and second time slots being implemented so they do not mutually overlap.

Therefore, a bidirectional single-wire interface is provided, in which information is exchangeable bidirectionally between a peripheral unit and a control unit via the same single-wire line using current flows generated separately in each case. For this purpose, the peripheral unit has its own power supply. Therefore, feedback information may be transmitted from the peripheral unit to the control unit even at the instants at which there is no activation of the peripheral unit by the control unit.

Within the first time slots and/or second time slots, the peripheral unit and/or the control unit may additionally generate a status signal by performing a current manipulation in the event of voltage-coded information or performing a voltage manipulation in the event of current-coded information, respectively.

Preferably, in the automobile field, the peripheral unit is connected to a 12 volt or a 42 volt battery voltage. This may be the same battery voltage as for the supply of the control unit or a separate supply voltage.

According to a preferred refinement, the peripheral unit is powered during the first time slots by the first current flow from the control unit to the peripheral unit. In this way, in case of activation by the control unit, for example, the low-power component of the electronics of the peripheral unit, specifically the driver device and the information-processing electronics, including the communication logic and/or the activation signals of the power electronics, may be powered.

According to a further preferred refinement, the information to be transmitted and/or uploaded is implemented as binary signals or analog signals.

According to a further preferred refinement, the information to be uploaded from the peripheral unit to the control unit is implemented as a diagnostic signal for diagnosis of the peripheral unit. Therefore, the control unit may perform an analysis of the status of the peripheral unit using the uploaded information.

According to a further preferred refinement, combustion chamber signals are implemented as information which is usable for engine regulation by the control unit.

According to a further preferred refinement, the information uploaded from the peripheral unit to the control unit is analyzed and implemented as a new control signal for controlling the peripheral unit. Therefore, the control unit may control the assigned peripheral unit in a way tailored to the current status of the system.

According to a further preferred refinement, the control unit is implemented as an engine control unit.

According to a further preferred refinement, the peripheral unit is implemented as an ignition coil or fuel injector of a motor vehicle engine or the like.

The control unit contains first means and the peripheral unit contains second means for information transmission. According to a further preferred refinement, the first and/or second means have resistors and switches, such as transistor switches and/or current or voltage sources, for generating the voltage-coded or current-coded information, the corresponding voltage or the corresponding current, respectively, being altered on the basis of a specific event and the corresponding information to be transmitted thus being generated.

According to a further preferred refinement, the status of the single-wire line between control units and peripheral units is checked for plausibility. In particular, a short-circuit to ground, a short-circuit to the supply voltage, and a line interruption may be detected.

BRIEF DESCRIPTION OF THE DRAWINGS

FIG. 7a shows the shape of a voltage curve over time of the activation during the first time slots in a switch-on operation of the first switch (S1) according to an exemplary embodiment of the present invention as shown in FIG. 2.

FIG. 7b shows the shape of a current curve over time on the single-wire line during the first time slots having a status signal from the peripheral unit according to an exemplary embodiment of the present invention.

FIG. 7c shows the shape of a signal curve over time of the primary current of an ignition coil during the first time slots, which, if a specific event occurs, triggers a status change at the peripheral unit according to an exemplary embodiment of the present invention.

FIG. 7d shows the shape of a curve over time of the primary voltage of an ignition coil in the second time slots in the peripheral unit according to an exemplary embodiment of the present invention.

FIG. 7e shows the shape of a curve over time of a first signal, which describes the duration of the bracketing and is transmitted from the peripheral unit to the control unit, according to a further exemplary embodiment of the present invention as shown in FIG. 3.

FIG. 7f shows the shape of a curve over time of a second signal, which describes the spark duration of the ignition spark and is transmitted from the peripheral unit to the control unit, according to a further exemplary embodiment of the present invention as shown in FIG. 3.

FIG. 8 shows diagnosis of the single-wire line.

DETAILED DESCRIPTION

Figure 1:
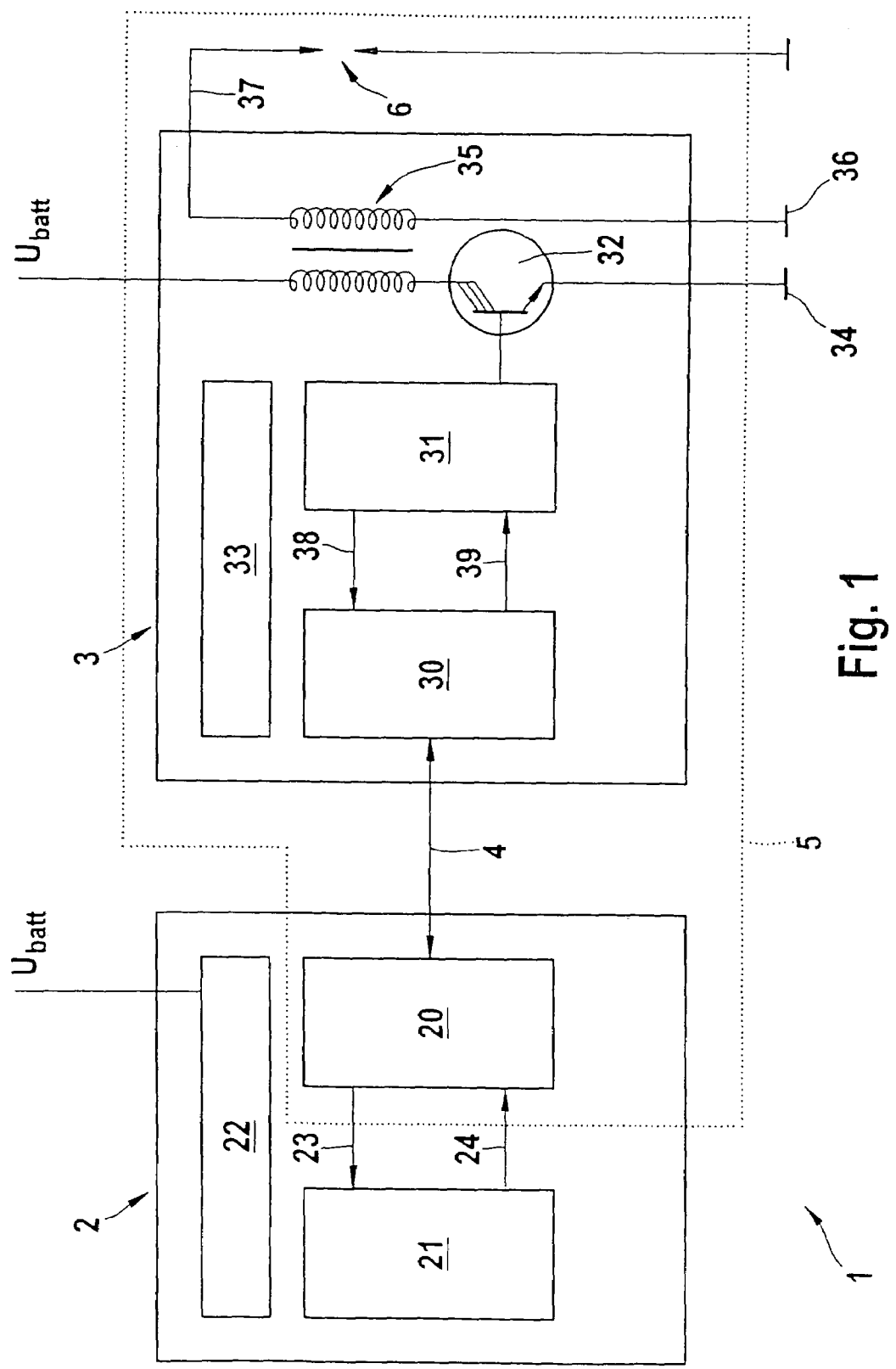
FIG. 1 shows a schematic illustration of a device according to the present invention including a control unit 2 and a peripheral unit 3, connected thereto via a single-wire line 4.

Identical reference numerals identify identical or functionally identical components in the figures.

FIG. 1 shows a schematic illustration of a device 1 for bidirectional transmission of data information via a single-wire line 4 between a control unit 2 and a peripheral unit 3 having an ignition coil 35, a fuel injector of a motor vehicle engine, a sensor or an actuator, or the like, for example.

In the following, the device is to be explained with reference to FIG. 1 as an example in regard to an ignition system 5 of a motor vehicle engine. Ignition system 5 includes, for example, a spark plug 6, a high-voltage connection 37, an ignition coil 35, an ignition trigger, such as a logic 31, an ignition output stage 32, a voltage supply 33, and a driver circuit 30 in a peripheral unit 3 and an engine control unit 2 having an ignition driver 20. Control unit 2 additionally contains an electronic controller 21 and a power supply 22.

Controller 21 is connected to a driver device 20 of control unit 2. Driver device 20 is connected via a single-wire line 4 to a driver device 30 of peripheral unit 3. As shown in FIG. 1, driver device 30 of peripheral unit 3 is connected to an information processing device 31, which may in turn be connected to power electronics 32 of peripheral unit 3. Furthermore, driver device 30 and power electronics 32 of peripheral device 3 are preferably connected to an external battery voltage, the power circuit preferably being closed via an electronic ground 34.

Information for switching an ignition coil 35 in peripheral unit 3 is transmitted from electronic controller 21 and/or control unit 2 in first time slots. The activation is ended when sufficient energy is stored in the coil and the desired moment of ignition has been reached. In this case, the first current flow from control unit 2 to peripheral unit 3 is ended. Subsequently, during second time slots, a second current flow from peripheral unit 3 to control unit 2 via the same single-wire line 4 may be generated, which indicates a specific event in peripheral unit 3.

It is to be noted that the first and second time slots may not overlap, since only one current flow in one direction via single-wire line 4 may occur in a specific time slot.

Information for a diagnosis of peripheral unit 3 and/or ignition coil 35, information for regulation of ignition coil 35, or similar information may be uploaded to control unit 2.

In the following, with reference to FIG. 2, the method according to the present invention will be explained in greater detail through an exemplary embodiment of the present invention for bidirectional single-wire data transmission, the resistor systems and switches generally merely being shown symbolically for a system of current sources and/or current sinks, which allow alteration and measurement of the interface current.

Control unit 2 has a driver device 20, which is preferably activated via an electronic controller 21. Driver device 20 is essentially composed of two areas according to one exemplary embodiment. The first area is used for generating a first current flow from driver device 20 via single-wire line 4 to peripheral unit 3. For this purpose, the driver device has a resistor R1, which is connected to a power supply 22. Resistor R1 is connected via a switch S1 and via single-wire line 4 to driver device 30 of peripheral unit 3. The second area of driver device 20 also includes a resistor R2, which is applied to ground and, via a second switch S2, is also connected via single-wire line 4 to driver device 30 of peripheral unit 3.

Resistors R1 and R2 are each connected via a detector unit 201 and by interface logic 202 to the electronic controller. Switches S1 and S2 are preferably also connected by interface logic 202 to the electronic controller.

Driver device 30 also includes two areas according to the exemplary embodiment of the present invention. The first area preferably includes a resistor R3, which is connected to a power supply 33 and, in addition, to a switch S3, which is connected to single-wire line 4.

The second area includes a resistor R4, which is applied to ground and, in addition, is connected to a switch S4, which is in turn connected to single-wire line 4.

Resistors R3 and R4 are connected via a detector unit 301 and by interface logic 302 to information processing device 31. Switches S1 and S2 are preferably also connected by interface logic 302 to information processing device 31.

In operation, for example, information transmission of control unit 2 to peripheral unit 3 is triggered in a first time slot. For this purpose, switches S2 and S3 must be open and S4 must be closed. A first current flow is then generated from power supply 22 having 5 V, for example, via resistor R1 and associated switch S1 and transmitted via single-wire line 4 to peripheral unit 3. In peripheral unit 3, a detector unit 301 at resistor R4 may detect an activation voltage.

Figure 3:
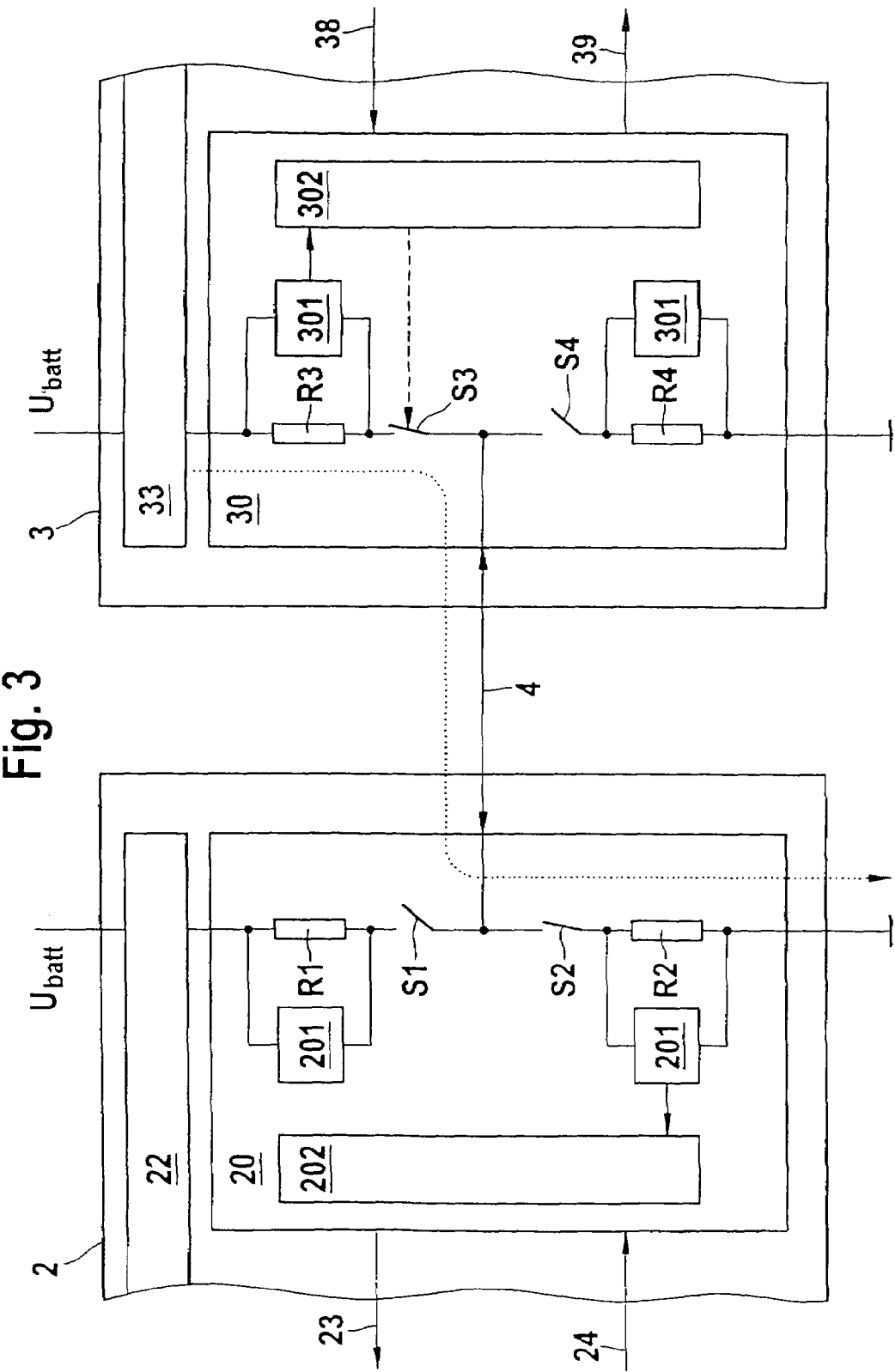
FIG. 3 shows a more detailed illustration of a device according to the present invention according to an exemplary embodiment of the present invention, the current flow during the second time slots being illustrated.

FIG. 3 shows an example of information transmission in a second time slot from peripheral unit 3 to control unit 2. For this purpose, switches S1 and S4 must be open and S2 must be closed. A second current flow is then generated from power supply 33 having 5 V, for example, via resistor R3 and associated switch S3 and transmitted via single-wire line 4 to electronic control unit 2. In control unit 2, a detector unit 201 at resistor R2 may detect a feedback voltage.

Figure 4:
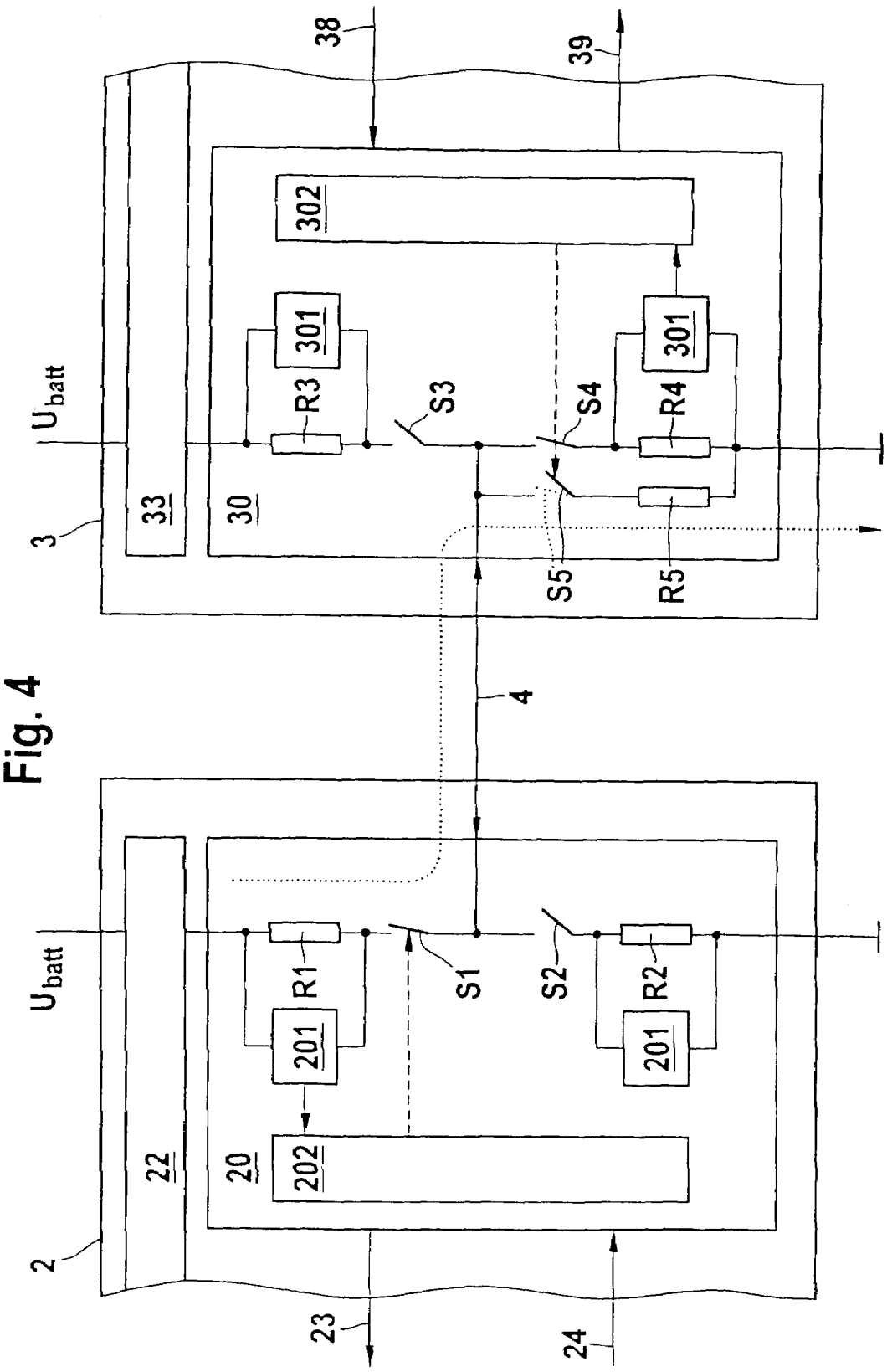
FIG. 4 shows a more detailed illustration of a device according to the present invention according to an exemplary embodiment of the present invention, the status signal in the first time slots being illustrated.

FIG. 4 shows a status signal in the first time slots. For this purpose, switches S2 and S3 must be open and S1 and S4 must be closed. During activation, for example, the current may be binary coded via an additional system in peripheral unit 3, including resistor R5 and a switch S5 in driver device 30 of peripheral unit 3, and the information may be uploaded to control unit 2 via same single-wire line 4. If the additional system in peripheral unit 3 includes a controllable current sink, analog information may be uploaded.

It may be determined, using a detector device 201 at resistor R1 in driver device 20, whether a specific event occurred in peripheral unit 3 in the first time slots, for example, by the opening of switch S5 and the current reduction associated therewith.

Driver device 20 subsequently preferably relays the received information to electronic controller 21 for further data evaluation and/or analysis.

Figure 5:
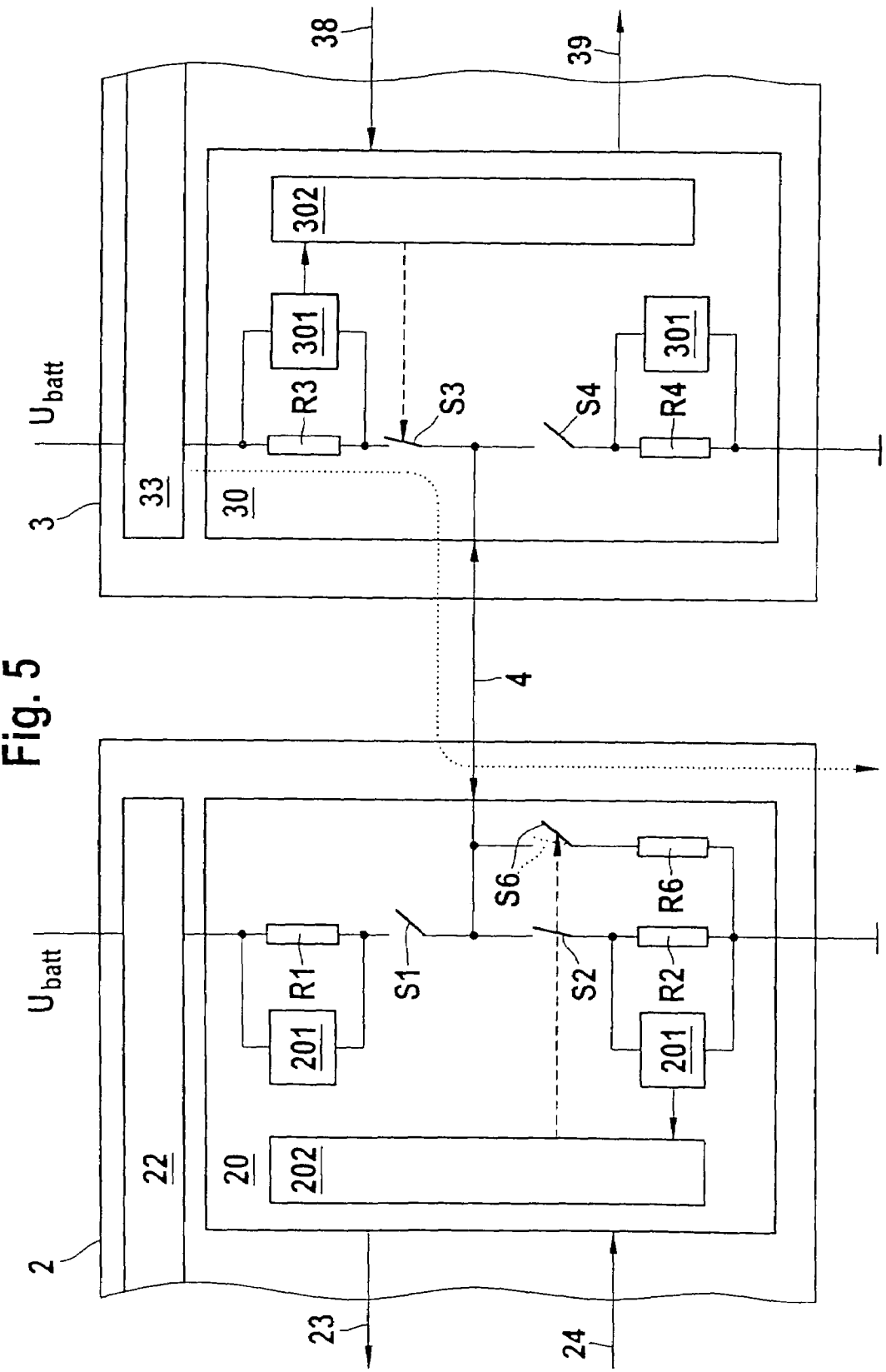
FIG. 5 shows a more detailed illustration of a device according to the present invention according to an exemplary embodiment of the present invention, the status signal in the second time slots being illustrated.

FIG. 5 shows a status signal in the second time slots. For this purpose, switches S1 and S4 must be open and S2 and S3 must be closed. During the information transmission from peripheral unit 3 to control unit 2, for example, the current may be binary coded via an additional system in control unit 2, including resistor R6 and a switch S6 in driver device 20 of control unit 2, and the information may be uploaded to peripheral unit 3 via same single-wire line 4. It may be determined, using a detector device 301 at resistor R3 in driver device 30, whether a specific event occurred in control unit 2 in the second time slots, for example, by the opening of switch S6 and the current reduction associated therewith.

If the additional system in control unit 2 includes a controllable current sink, analog information may be uploaded.

Figure 6:
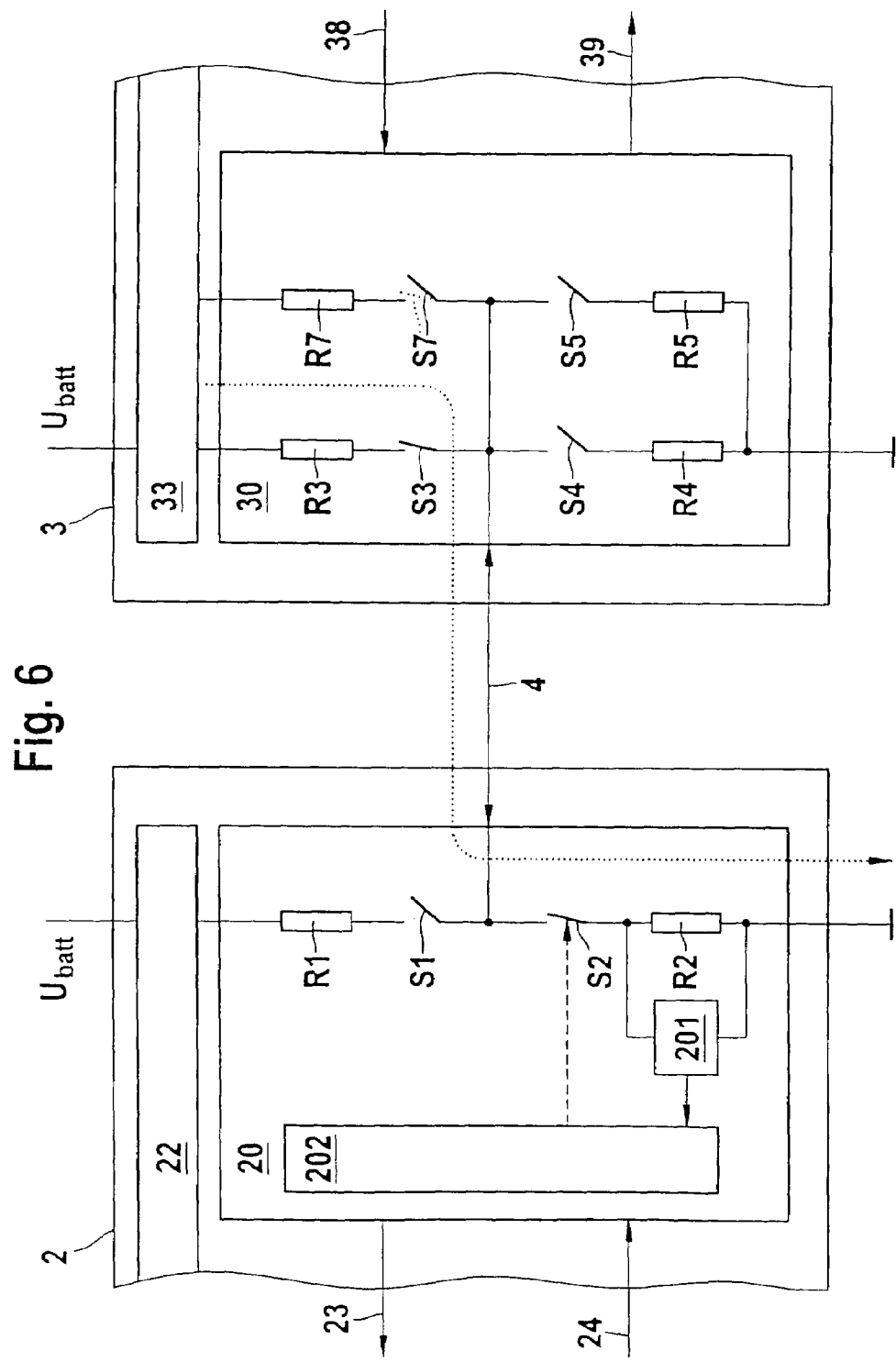
FIG. 6 shows a more detailed illustration of a device according to the present invention according to an exemplary embodiment of the present invention, the status message in the second time slots being illustrated.

FIG. 6 shows an example of an additional status signal in the second time slots. In this case, switches S1, S4, and S5 are open and S2 and S3 are closed. For this purpose, the further resistor system, including resistors R3 and R7, which are connected in parallel, is provided in driver device 30. Resistors R3 and R7 are each connected via a switch S3 or S7, respectively, to single-wire line 4. Since this system, as shown in FIG. 6, is connected to its own voltage source 33, an alteration of the second current flow from peripheral unit 3 to control unit 2 via same single-wire line 4 may be generated, whose value is a function of connectable resistor R7. It may be determined using a detector device 201 at resistor R2 in driver device 20 whether a specific event occurred in peripheral unit 3, for example, by the closing of switch S7 and the current increase associated therewith.

If the additional system in driver unit 30 in peripheral unit 3 includes a controllable current source, analog information may be transmitted.

In the following, examples of the information and/or signals to be transmitted will be explained with reference to FIGS. 7a through 7f.

FIG. 7a shows an example of the shape of the curve over time of a voltage activation of the peripheral unit in the first time slots when S1 is switched on. By applying a voltage of this type, a first current flow from control unit 2 to peripheral unit 3 is generated (FIG. 4).

If a specific event occurs in peripheral unit 3, e.g., the primary current in ignition coil 35 exceeds a specific value If1, as shown in FIG. 7c, switch S5 is opened and the first current flow is reduced, as shown in FIG. 4. This is illustrated in FIG. 7b, which shows the shape of the curve over time of the first current flow as an example. This change in the first current flow may be detected by control unit 2 during the activation and analyzed, as was explained in detail above.

FIG. 7d schematically shows the shape of the curve over time of the voltage at the primary terminal of ignition coil 35, which is connected to power electronics 32. In the second time slots, this voltage increases until it reaches a predefined voltage value, which is delimited by bracketing, for example. Upon reaching the maximum voltage value, one of switches S3 or S7 is closed, as explained in FIG. 6, for example, depending on which event has occurred in peripheral unit 3 and is accordingly to be communicated to control unit 2.

In FIG. 7e, the signaling that a first voltage threshold U1 has been exceeded, using a first signal by closing first switch S6, for example, is illustrated. This information is transmitted from peripheral unit 3 to control unit 2 and analyzed according to the methods explained in detail above.

In FIG. 7f, a further exemplary embodiment of an event, for example, the spark duration of a spark plug, is shown as an example of a signal. If the voltage in the second time slots has exceeded a threshold U2, which corresponds to the spark duration, this event is signaled, for example, by additionally closing switch S7 and generating a corresponding current flow to control unit 2 via single-wire line 4.

Therefore, by analyzing the current strengths of the first and second current flows, specific events in the peripheral unit and/or in the system may be detected in real-time and transmitted bidirectionally in both time slots in a chronologically synchronized way.

FIG. 8 and Table 1 show the diagnosis of single-wire line 4 in control unit 2.

Figure 2:
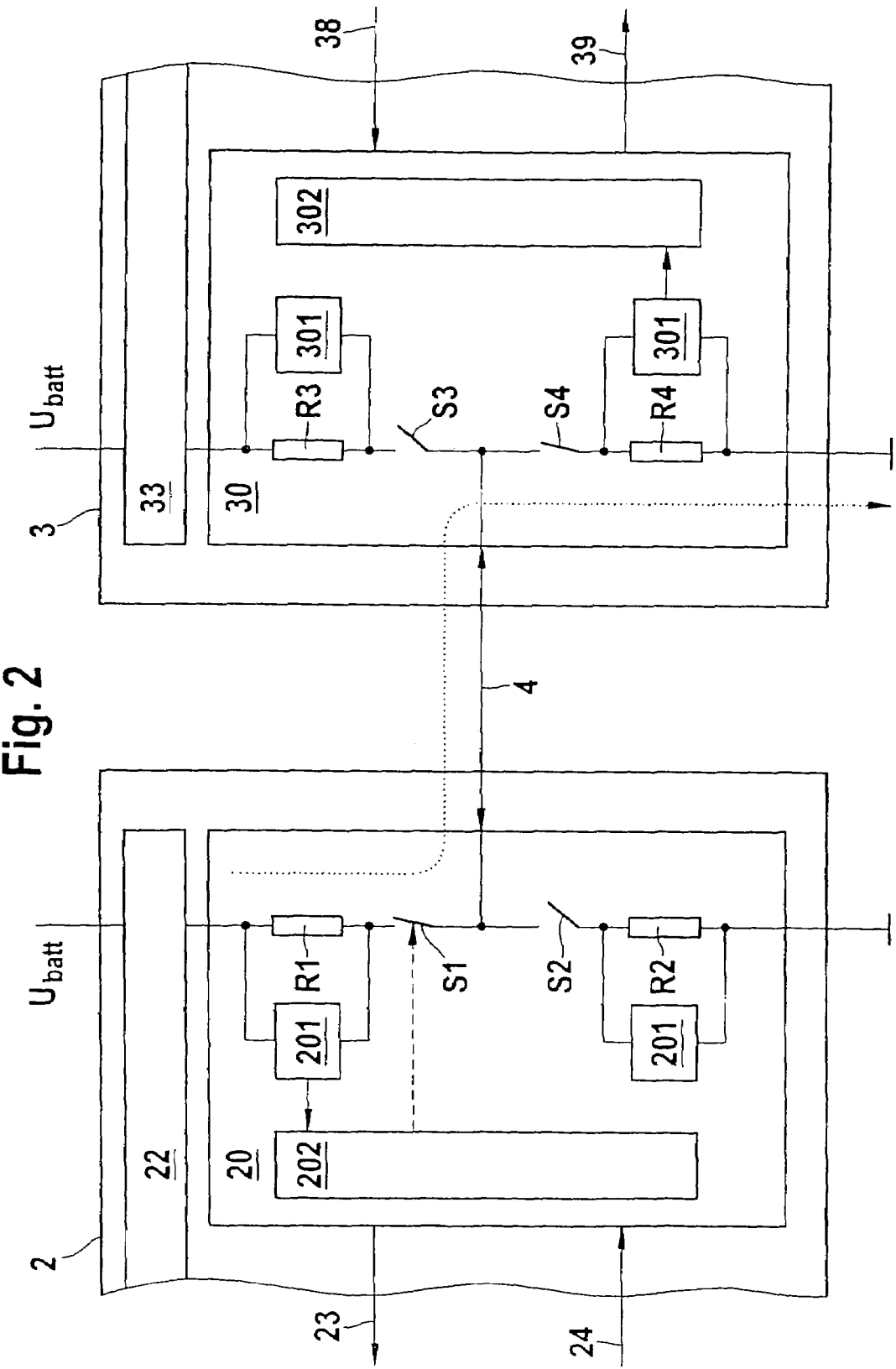
FIG. 2 shows a more detailed illustration of a device according to the present invention according to an exemplary embodiment of the present invention, the current flow during the first time slots being illustrated.

The proper function of single-wire interface 4 may be diagnosed in the first time slots: if, for example, with closed switches S1 and S4 and open switches S2 and S3 as shown in FIG. 2 or FIG. 4, no current is detected in the line at R1, there is probably an interruption of the line. If line 4 is short-circuited to ground, either the current is atypically high or the voltage at the interface is approximately at 0 V. A short-circuit to the battery voltage (Ubatt) of the vehicle electrical system either results in an inverse current, because, among other things, the supply voltage (Usupply) is less than the battery voltage of the vehicle electrical system, or the voltage at the interface is at Ubatt.

In the second time slots: if, for example, with closed switches S2 and S3 and open switches S1 and S4 as shown in FIG. 3 or FIG. 5, no current is detected in the line at R2, there is an interruption of the line or a short-circuit to ground. A short-circuit to the battery voltage of the vehicle electrical system either results in an atypically high current or the voltage at the interface is approximately at Ubatt.

TABLE 1

| Switch S1 | Switch S2 | Current I | Voltage U | Status |
|---|---|---|---|---|
| First time slots | | | | |
| On | Off | 0 | Usupply | Interruption |
| On | Off | I inverse | Ubatt | Short-circuit to Ubatt |
| On | Off | >Imax | 0 | Short-circuit to ground |
| Second time slots | | | | |
| Off | On | 0 | 0 | Interruption or short-circuit to ground |
| Off | On | >Imax | Ubatt | Short-circuit to Ubatt |
| Off | On | 0 | 0 | Interruption or short-circuit to ground |

Although the present invention was described above on the basis of preferred exemplary embodiments, it is not restricted thereto, but rather may be modified in manifold ways.

In particular, instead of a current-coded information transmission, a voltage-coded information transmission may also be performed. In this case, a constant current flow and a change in the corresponding applied voltage in case of an occurring event are to be ensured. The procedure, i.e., the uploading of the information and/or the analysis, is performed analogously to the exemplary embodiments explained in detail above. The corresponding components are merely implemented as current sources instead of as voltage sources. The resistor systems of driver device 30 of peripheral unit 3 are implemented in such a way that in the event of a voltage status signal, the total resistance is changed in such a way that in the event of a constant current, the particular applied voltage varies, i.e., voltage-coded information is uploaded.

The information to be transmitted and/or uploaded may also be modulated and/or implemented, transmitted, and analyzed both as a binary signal and as an analog signal.

What is claimed is:

1. A method for bidirectional single-wire data transmission of data information between a control unit and at least one peripheral unit, comprising:
   performing at least one of:
   generating a first current flow from the control unit to the peripheral unit during first time slots via a single-wire line to transmit one of voltage-coded information and current-coded information from the control unit to the peripheral unit, and
   generating a second current flow from the peripheral unit to the control unit during second time slots via the single-wire line to transmit at least one of the voltage-coded information and the current-coded information from the peripheral unit to the control unit;
   implementing the first time slots and the second time slots so they do not mutually overlap;
   generating additional information in at least one of the first time slots and the second time slots;
   transmitting the additional information as one of digital signals and analog signals by modulating one of a current and a voltage of the single-wire line;
   analyzing the additional information in one of the control unit and the peripheral unit.

2. The method as recited in claim 1, further comprising: connecting the peripheral unit to its own power supply.

3. The method as recited in claim 1, further comprising: activating the peripheral unit by the first current flow from the control unit to the peripheral unit.

4. The method as recited in claim 1, wherein:
   the at least one of the transmission and uploading of the additional information occurs in real-time.

5. The method as recited in claim 1, wherein the additional information is implemented as a digital signal on a plurality of stages.

6. The method as recited in claim 1, wherein the additional information is implemented as a diagnostic signal for diagnosis of the peripheral unit.

7. The method as recited in claim 1, further comprising: diagnosing a proper function of a single-wire interface.

8. The method as recited in claim 1, wherein the additional information is implemented as the basis for calculating a new control signal for controlling the peripheral unit.

9. A device for bidirectional single-wire data transmission of data information between a control unit and at least one peripheral unit, comprising:
   at least one of the following:
      a first arrangement, provided in the control unit, for generating a first current flow for transmitting one of voltage-coded information and current-coded information from the control unit to the peripheral unit during first time slots via a single-wire line, and
      a second arrangement, provided in the peripheral unit, for generating a second current flow for transmitting one of the voltage-coded information and the current-coded information from the peripheral unit to the control unit during second time slots via the single-wire line;
   an arrangement for modulating one of a current and a voltage of the single-wire line in at least one of the first time slots and the second time slots for additional information;
   an arrangement for transmitting the additional as one of digital signals and analog signals; and
   an arrangement, provided in one of the control unit and the peripheral unit, for detecting the additional information.

10. The device as recited in claim 9, wherein the control unit is implemented as an engine control unit.

11. The device as recited in claim 9, wherein the peripheral unit is implemented as a component having electronics.

12. The device as recited in claim 11, wherein the component includes one of an ignition coil and a fuel injector of a motor vehicle engine.

13. The device as recited in claim 11, wherein at least one of the first arrangement and the second arrangement include resistors and switches or current sources or voltage sources for an alteration in the voltage-coded or current-coded information.

14. The device as recited in claim 9, wherein:
   the peripheral unit is powered during the first time slots by the first current flow from the control unit to the peripheral unit, thereby, in case of activation by the control unit, powering low-power electronics of the peripheral unit including a driver device and information-processing electronics, including at least one of a communication logic and an activation of power electronics.

* * * * *